(12) United States Patent
Hollinger

(10) Patent No.: US 6,422,402 B1
(45) Date of Patent: Jul. 23, 2002

(54) NAPKIN HOLDER WITH SUCTION CUP

(75) Inventor: Fred Hollinger, Kings Park, NY (US)

(73) Assignee: E&B Giftware LLC, Yonkers, NY (US)

( * ) Notice: Subject to any disclaimer, the term of this patent is extended or adjusted under 35 U.S.C. 154(b) by 0 days.

(21) Appl. No.: 09/840,644

(22) Filed: Apr. 23, 2001

(51) Int. Cl.⁷ .............................................. B42B 5/00
(52) U.S. Cl. ...................... 211/50; 248/205.8; 211/13.1
(58) Field of Search ................... 211/189, 181.1, 211/49.1, 85.4, 13.1, 50; D7/631, 632, 633; 24/7; 248/683, 176.1, 205.5, 205.1, 205.8, 206.3, 309.1, 309.3, 206.2, 500, 150, 153, 154

(56) References Cited

U.S. PATENT DOCUMENTS

| | | | | |
|---|---|---|---|---|
| 3,276,734 A | * | 10/1966 | Goldblatt | |
| 3,750,991 A | * | 8/1973 | Ragir | 248/206 |
| 4,117,936 A | * | 10/1978 | Dawson | 211/50 |
| 4,298,126 A | * | 11/1981 | Filipowicz | 211/50 |
| 4,580,751 A | * | 4/1986 | Panzer | 248/205.8 |
| 4,813,640 A | * | 3/1989 | Perentin | 248/205.8 |
| 4,896,954 A | * | 1/1990 | Swanson | 248/467 |
| 5,087,005 A | * | 2/1992 | Holoff et al. | 248/205.8 |
| 5,318,262 A | * | 6/1994 | Adams | 248/205.8 |
| 5,495,884 A | * | 3/1996 | Shikler | 160/120 |
| 5,592,244 A | * | 1/1997 | Vyhmeister | 248/309.1 |
| 5,630,517 A | * | 5/1997 | Maznik | 211/70.6 |
| 5,649,634 A | * | 7/1997 | Irizarry | 211/120 |
| 5,779,066 A | * | 7/1998 | Drower et al. | 211/60.1 |
| D397,587 S | * | 9/1998 | Hollinger | D7/631 |
| 5,862,816 A | * | 1/1999 | Lowe | 248/467 |
| 5,996,950 A | * | 12/1999 | Richter | 248/205.5 |
| 6,142,432 A | * | 11/2000 | Amussen | 248/205.5 |
| D438,067 S | * | 2/2001 | Goodman et al. | D7/631 |
| 6,193,197 B1 | * | 2/2001 | Lian | 248/206.2 |
| 6,308,923 B1 | * | 10/2001 | Howard | 248/205.5 |

* cited by examiner

Primary Examiner—Daniel P. Stodola
Assistant Examiner—Jennifer E. Novosad
(74) Attorney, Agent, or Firm—Gerard F. Dunne

(57) ABSTRACT

A holder for table napkins has a base supporting prongs for engaging table napkins to hold them upright. A suction cup is held to the underside of the base for holding the base securely to a surface such as a table upon removal of a napkin. The suction cup has upstanding portions engaging the underside of the base to enable the suction cup to be depressed by movement of the napkin holder downwardly. In preferred form, the base has an opening for receiving a tab connected to the suction cup for releasing the suction cup from the table.

8 Claims, 6 Drawing Sheets

NAPKIN HOLDER WITH SUCTION CUP

FIELD OF THE INVENTION

The present invention relates to a holder for table napkins, and the napkin holder has a suction cup attached to its base to secure the holder to a table top upon removal of a napkin.

BACKGROUND OF THE INVENTION

Holders for table napkins are well-known; and often the napkins are held by the holder in an upright position by upstanding prongs. In this way, the table napkins can be arranged attractively and the napkin holder can be used for various size napkins with minimal need for space on a table top. Unfortunately, the napkin holder may become unstable when a napkin is attempted to be removed, particularly should napkins become wedged within the holding prongs.

It is, therefore, an object of the present invention to provide a holder for table napkins that may be placed on a surface such as a table top to hold upright napkins securely with minimal use of table space.

SUMMARY OF THE INVENTION

According to the present invention, a-holder for table napkins has a base and upstanding prongs for holding a plurality of napkins in an upright position. A suction cup is held to the underside of the base and adapted to be depressed downwardly by movement of the napkin holder for securing the base to a surface such as a table top. The upper surface of the suction cup preferably has upstanding portions to engage the undersurface of the base to depress the suction cup assuredly upon downward movement of the holder. In this way, the napkin holder can be secured to a table or counter top securely.

In a preferred form of the present invention, the base has an opening, and a tab upstanding from the suction cup extends through the opening for enabling the suction cup to be released from the surface. Further, the suction cup may have an upstanding knob with an enlarged end that may be fitted within a central opening of the base to hold the suction cup in place.

These and other objects, advantages and features of the present invention will become apparent from the description given below of a preferred embodiment, which description is made in conjunction with the following drawing figures.

Figure 5:
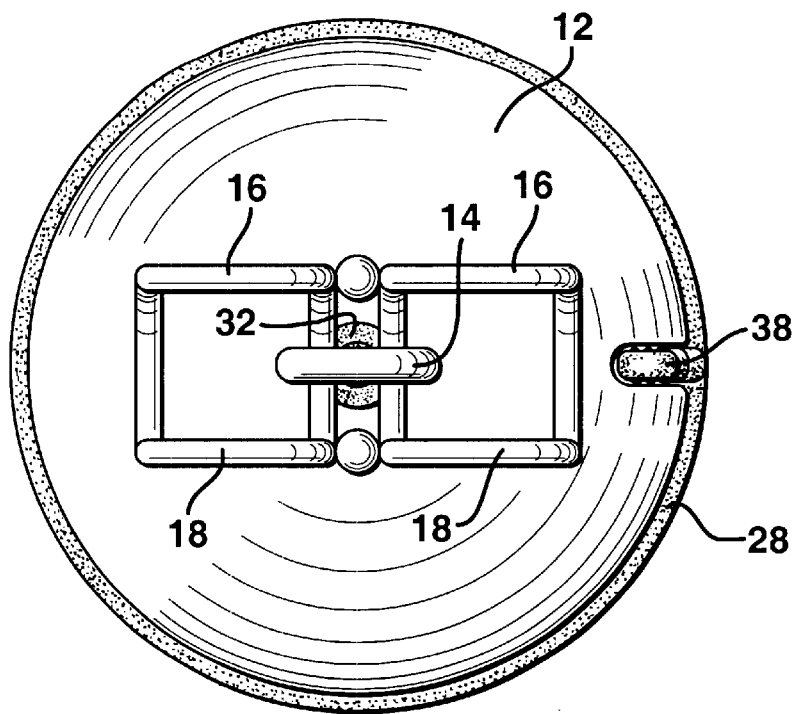
Figure 6:
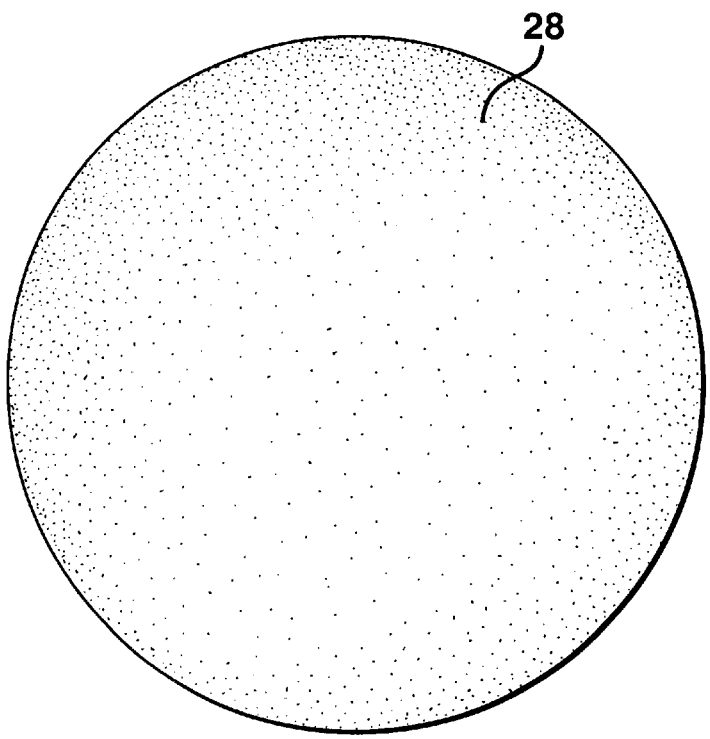

FIG. 5 i a top view thereof;

FIG. 6 is a bottom view thereof; and

Figure 7:
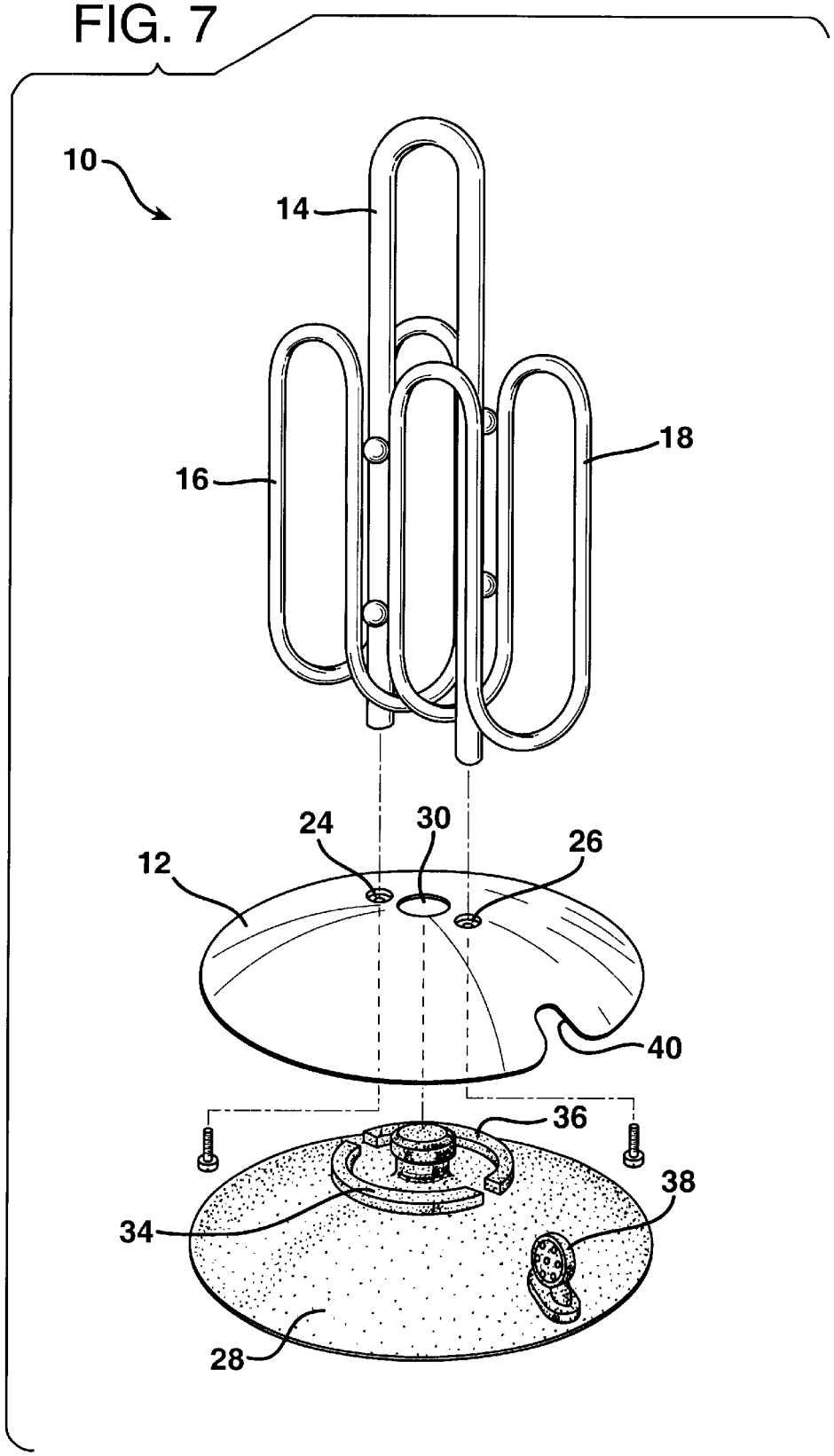

FIG. 7, illustrates the napkin holder of the present invention in exploded form.

Figure 1:
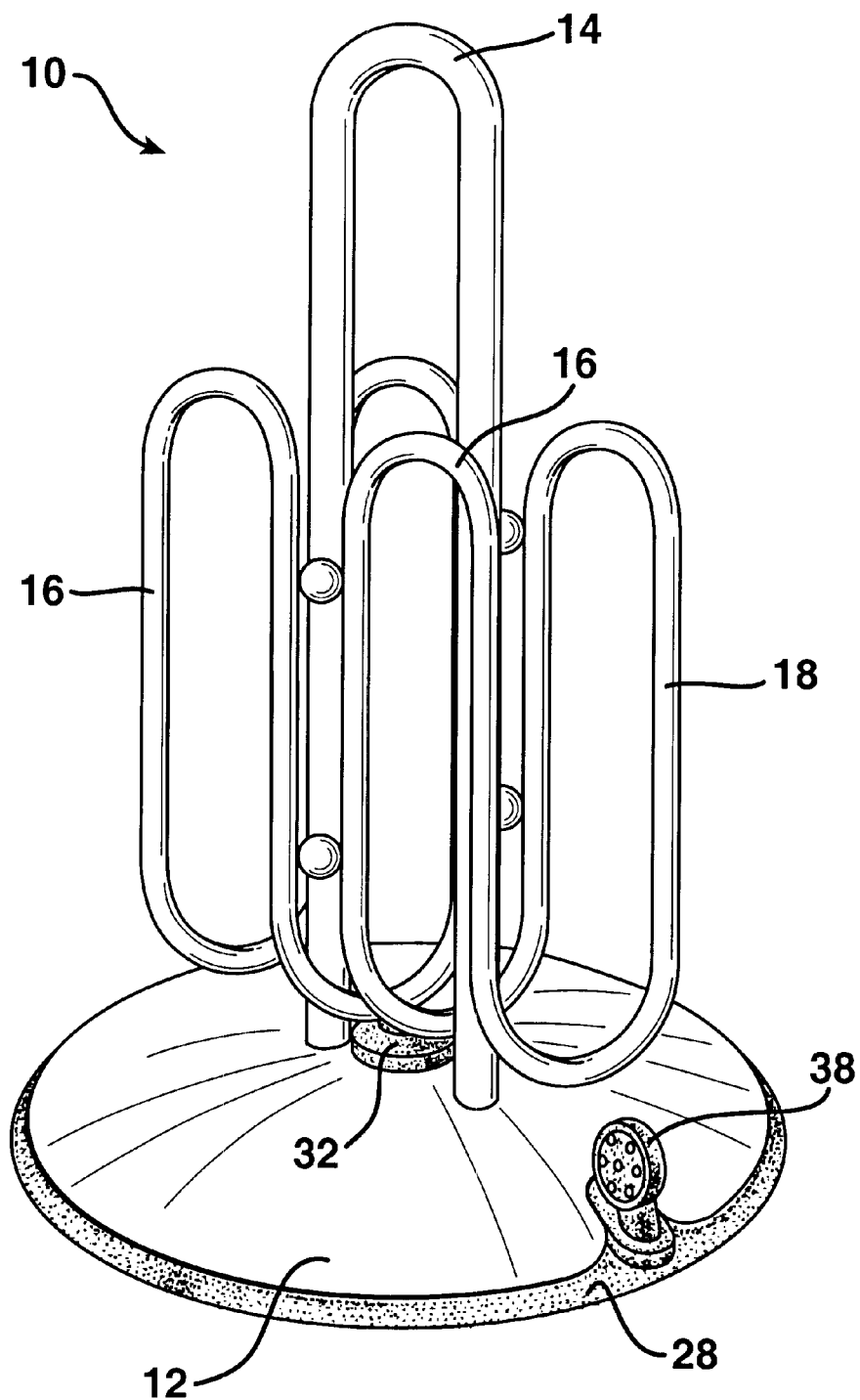
FIG. 1 is a perspective view of a napkin holder of the present invention.
Figure 2:
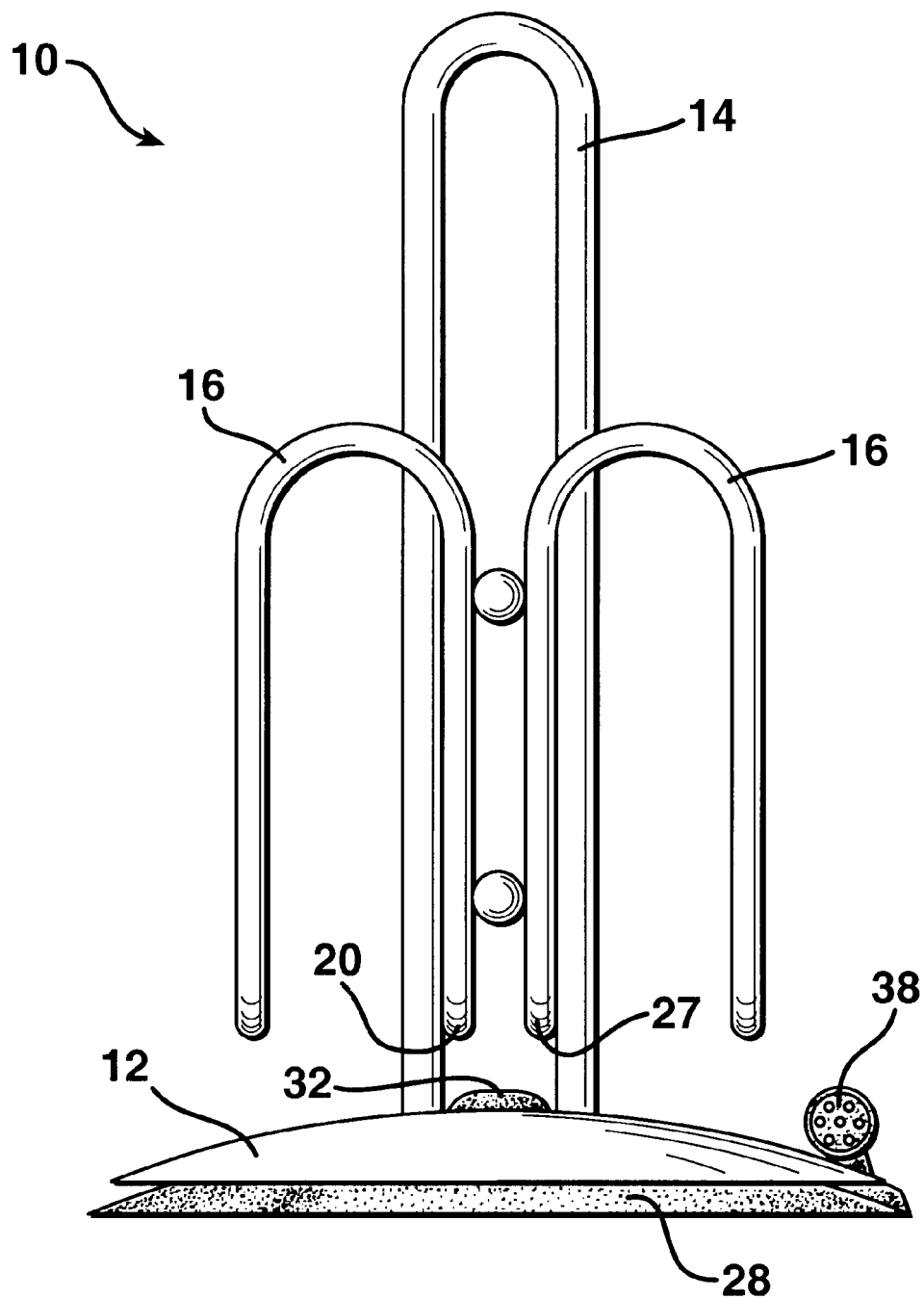
FIG. 2 is a side elevational view of a napkin holder of the present invention.
Figure 3:
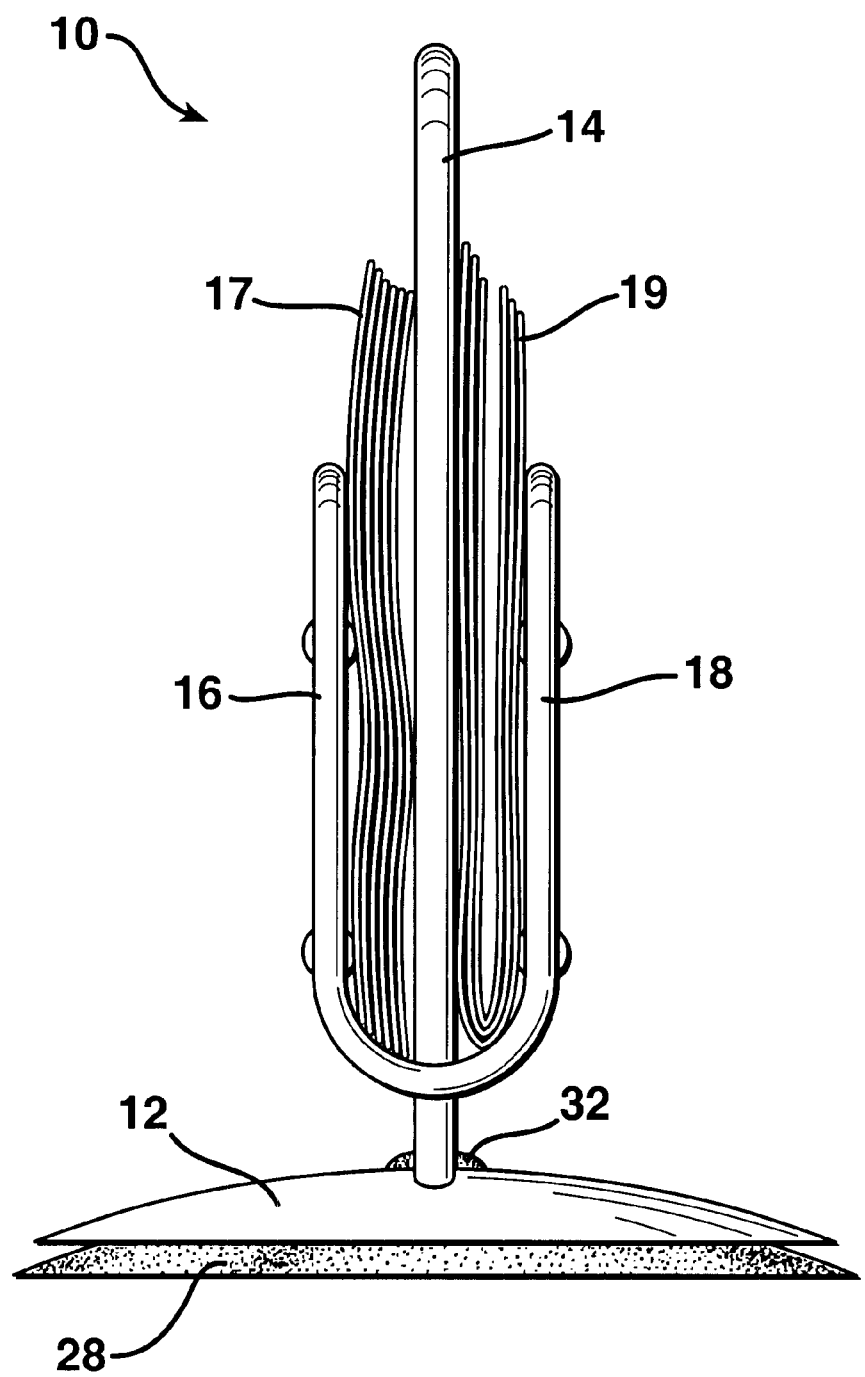
FIG. 3 is a front elevational view of a napkin holder of FIG.
Figure 4:
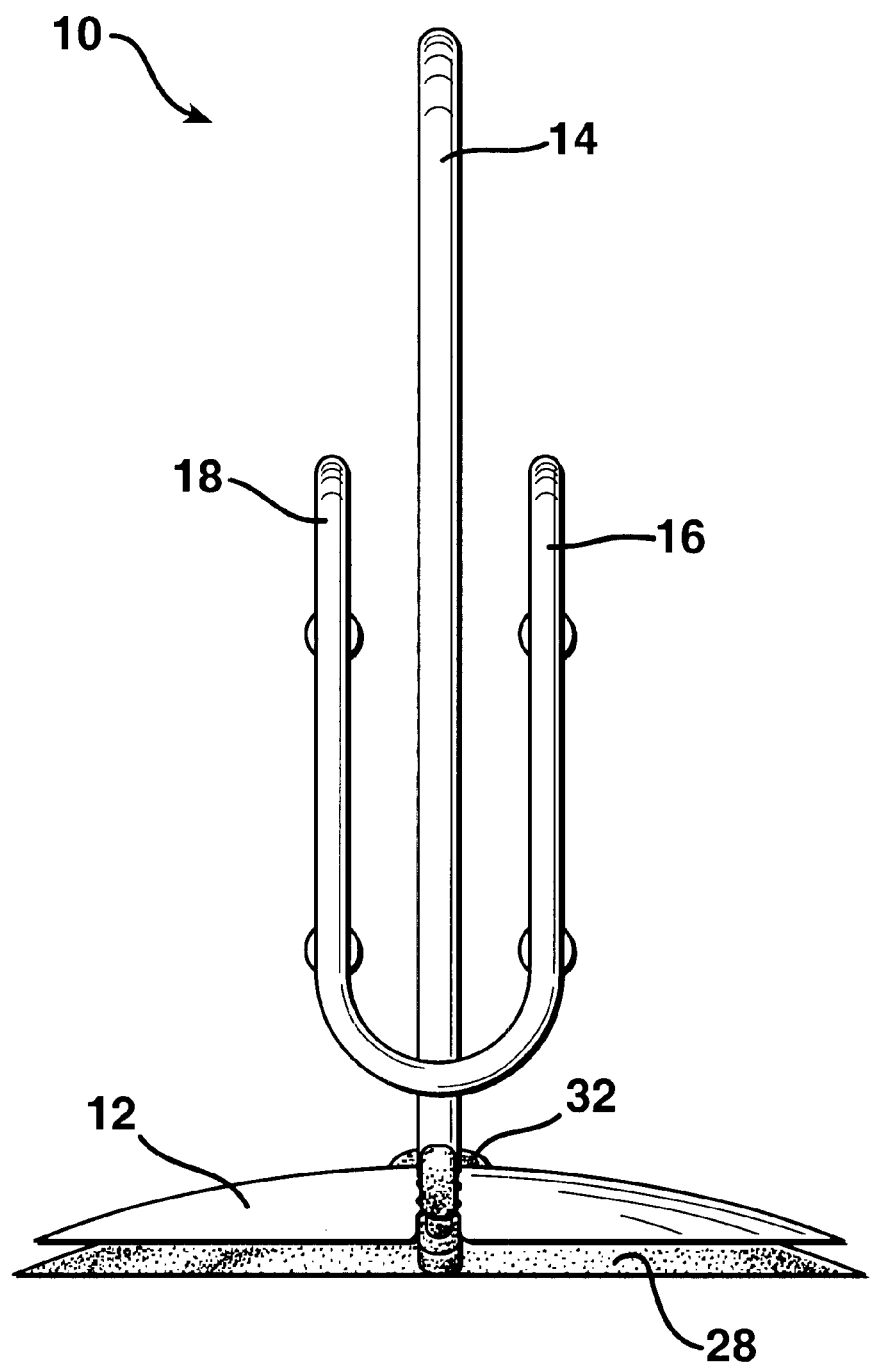
FIG. 4 illustrates the rear elevational view thereof.

As illustrated in FIG. 1, a napkin holder 10 of the present invention includes a domed base 12 having an upstanding central member 14 flanked by a pair of adjacent side elements 16 and a pair of adjacent side elements 18. The central member 14. and side elements 16 and 18 are formed of a resilient material, preferably a decorative metal, and as will be understood by those skilled in the art, form prongs to hold a plurality of table napkins that may be placed between adjacent side elements 16 and the central member 14; or between adjacent side elements 18 and the central member 14. In this way, table napkins 17 of any number of sizes may be placed upright on edge as shown in FIG. 3 or, perhaps, larger napkins 19 may be folded and inserted fold down between adjacent side elements and the central member 14.

The side elements 16 and 18 may be held to lower portions 20 and 27 of the base of the central member 14 by fusing or spot welding to form a unit. As shown in FIG. 7, the lower ends of the central member 14 may be fitted into complimentary openings 24 and 26 formed in the base 12, and held by set screws.

In use, a napkin held by the napkin holder may be pulled from the holder by a user; and this may cause the napkin holder 10 to move along the table or counter top or even be lifted by the user attempting. to remove a napkin.

In order to secure the napkin holder 10 to a table or counter top or the like, fitted beneath the base 12 is an elastomeric device to provide suction; and preferably a dome-shaped suction cup 28 formed of an elastomeric material conforming to the contour of the base 12 is fitted to the base. As can be seen in FIG. 7, a central opening 30 is formed within the domed-shaped base 12; and an upstanding elastomeric knob 32 extends upwardly from the central portion of the suction cup 28 and has an enlarged end portion which may be compressed and inserted through the opening 30 to secure the suction cup 28 in position beneath the base 12.

Downward pressure provided to the unit of the upstanding central member 14 and the side elements 16 and 18 will cause the suction cup to be depressed against a surface such as a table top or the like to cause the suction cup to grip the surface.

The suction cup 28 has upstanding projections 34 and 36 preferably formed as ridges adapted to engage the undersurface of the base 12. In this way, downward movement of the holder 10 will cause the base 12 to press firmly against the projections 34 and 36 and assuredly depress the suction cup to a table, counter top or the like. The projections 34 and 36 may, as illustrated, be a pair of semi-circular ridges arranged concentrically around the knob.32.

A tab 38 is connected integrally to the suction cup 28; and extends upwardly through a slotted opening 40 in the base 12. In use, the napkin holder 10 may be secured and placed on-a surface such as a table by being pressed forcibly downward to provide a suction gripping the table; and the suction can be released by the user simply grasping the tab 38 and lifting to separate an adjacent lip of the suction cup from the table surface to release the suction and enable the napkin holder to be removed.

These and other objects, advantages and features of the present invention will be understood from the detailed description of a preferred embodiment made above; however, the present is invention is not limited by any details of the above but is set forth by the appended claims.

What is claimed is:

1. A napkin holder having a domed-shaped base, upstanding prong members extending upwardly from said base and adapted to hold napkins, and a suction cup held beneath said base, said suction cup conforming to the domed-shaped contour of the undersurface of said base and adapted to be depressed by downward movement of the napkin holder for holding the napkin holder securely to a supporting surface, said suction cup having upstanding projections formed thereon, said projections being adapted to engage the undersurface of said base upon the downward movement of said napkin holder to firmly press said suction cup towards the supporting surface.

2. A napkin holder as set forth in claim 1, said base having an opening on a peripheral edge portion thereof, and a tab upstanding from a peripheral edge portion of said suction cup and extending through said opening for enabling the suction cup to be released from the supporting surface by lifting of said tab.

3. A napkin holder as set forth in claim 1, said suction cup having an upstanding knob adapted to be press-fitted through a central opening in said base, said projections being formed by a pair of semi-circular ridges arranged concentrically about said knob.

4. A napkin holder as set forth in claim 1, said prong members being formed by an upstanding central member and side elements held to said cental member to form a unit held centrally to said base.

5. A napkin holder having a domed-shaped base, upstanding prong members extending upwardly from said base and adapted to hold napkins, and a suction cup held beneath said base, said suction cup conforming to the domed-shaped contour of the undersurface of said base and adapted to be depressed by downward movement of the napkin holder for holding the napkin holder securely to a supporting surface, said suction cup having a central portion held to the underside of said base and having upstanding projections formed on the surface thereof, said projections being formed by a pair of semi-circular ridges arranged concentrically about said central portion and adapted to engage the undersurface of said base upon the downward movement of said napkin holder to firmly press said suction cup towards the supporting surface.

6. A napkin holder as set forth in claim 5, said base having an opening on a peripheral edge portion thereof, and a tab upstanding from a peripheral edge portion of said suction cup and extending through said opening for enabling the suction cup to be released from the supporting surface by lifting of said tab.

7. A napkin holder as set forth in claim 5, said suction cup having an upstanding knob having an enlarged end portion adapted to be press-fitted through a central opening in said base, said pair of semi-circular ridges being arranged concentrically about said knob.

8. A napkin holder as set forth in claim 5, said prong members being formed by an upstanding central member and side elements held to said cental member to form a unit held centrally to said base.

* * * * *